United States Patent [19]
Larkin et al.

[11] Patent Number: 5,779,617
[45] Date of Patent: Jul. 14, 1998

[54] TOOL HEAD POSITIONING DEVICE

[75] Inventors: Barry E. Larkin, Timonium; Meyer L. Ruthenberg, Owings Mills, both of Md.

[73] Assignee: United Container Machinery, Inc., Glen Arm, Md.

[21] Appl. No.: 678,555

[22] Filed: Jul. 8, 1996

[51] Int. Cl.$^6$ ........................ B31B 1/14
[52] U.S. Cl. ........................ 493/475; 493/365; 493/367; 493/370; 493/403; 83/499
[58] Field of Search .......................... 493/361, 365–367, 493/370, 475, 402, 403; 83/499

[56] References Cited

U.S. PATENT DOCUMENTS

| | | | |
|---|---|---|---|
| 3,456,565 | 7/1969 | Flaum et al. | |
| 4,010,677 | 3/1977 | Hirakawa et al. | 83/499 |
| 4,026,176 | 5/1977 | Weiskopf | 83/502 |
| 4,033,217 | 7/1977 | Flaum et al. | 83/499 |
| 4,132,157 | 1/1979 | Shinomiya | 493/403 |
| 4,214,495 | 7/1980 | Coburn | 83/499 |
| 4,224,847 | 9/1980 | Tokuno | 83/499 |
| 4,237,761 | 12/1980 | Coburn | 83/499 |
| 4,252,044 | 2/1981 | Yamashita et al. | 83/499 |
| 4,261,239 | 4/1981 | Toboshi et al. | 493/370 |
| 4,269,097 | 5/1981 | Linn | 493/370 |
| 4,515,052 | 5/1985 | Flaum | 83/479 |
| 4,516,454 | 5/1985 | Mosburger | 83/499 |
| 4,627,214 | 12/1986 | Anderson et al. | 83/499 |
| 4,649,782 | 3/1987 | Cavagna | 83/499 |
| 4,684,360 | 8/1987 | Tokuno et al. | 493/367 |
| 4,798,110 | 1/1989 | Tokuno et al. | 83/13 |
| 4,843,933 | 7/1989 | Seki et al. | 83/499 |
| 4,887,502 | 12/1989 | Voges | 83/499 |
| 4,926,730 | 5/1990 | Garrett | 83/499 |
| 5,057,068 | 10/1991 | Capdeboseq | 493/355 |
| 5,097,732 | 3/1992 | Tahara | 83/499 |
| 5,125,301 | 6/1992 | Miller et al. | 83/499 |
| 5,297,464 | 3/1994 | Mayer | 83/499 |

*Primary Examiner*—Michael J. Carone
*Assistant Examiner*—Darren Ark
*Attorney, Agent, or Firm*—Biebel & French

[57] ABSTRACT

A tool positioning device for use in combination with a machine for working paperboard blanks conveyed in a horizontal direction through the machine. The machine includes pairs of parallel rotary shafts wherein each pair of shafts includes upper and lower shafts and carry a plurality of tool heads. The positioning device includes a plurality of coupling members actuated in a vertical direction by actuators wherein the coupling members are moved downwardly into engagement with the tool heads. The coupling members are supported on an actuator support which is mounted to a transfer structure wherein the transfer structure moves the actuator support in axial movement to thereby slide the tool heads along their respective shafts to preselected positions along the shafts.

20 Claims, 2 Drawing Sheets

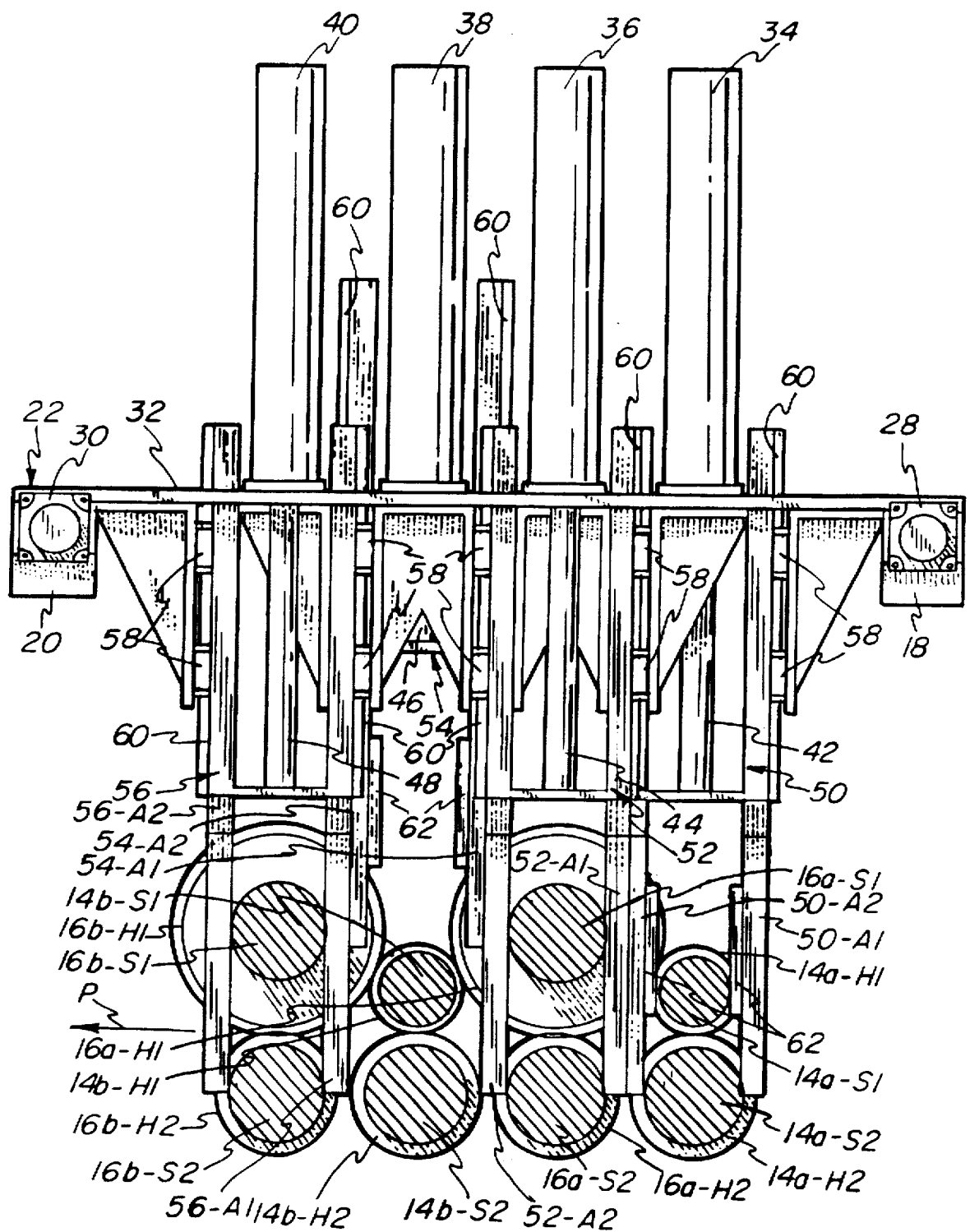

TOOL HEAD POSITIONING DEVICE

BACKGROUND OF THE INVENTION

1. Field of the Invention

The present invention relates to a tool positioning device and, more particularly, to a tool positioning device in a machine for working paperboard blanks conveyed through the machine.

2. Related Prior Art

Boxes, such as those made from corrugated board or paperboard, are generally made by cutting a paperboard blank to the desired outside dimensions of the various walls and flaps, scoring the blank on the fold lines and slotting the blank between the various flaps so that the blank may be readily folded to form walls and flaps for the box. In conventional machines for forming box blanks, the tool heads for slotting and scoring the blanks are mounted in mated positions on successive pairs of shafts wherein each pair of shafts is oriented with one shaft above the other. Thus, the slotting and scoring operations take place serially as the blank is fed along a horizontal feed path into a nip between the heads on the paired shafts. In order to produce different sized boxes on the same machine, the position of the slotting and creasing heads on their respective shafts may be adjusted in an axial direction. There are usually a plurality of tool head pairs located along each pair of shafts, and the manual adjustment of such tool head pairs in prior art machines has proven to be a time consuming task.

Accordingly, various power driven adjusting mechanisms have been proposed to reduce the amount of time required to adjust the heads and to facilitate accurate positioning of the heads along the shafts. Examples of typical mechanisms for adjusting the position of the tool heads may be seen in U.S. Pat. Nos. 4,033,217 and 4,515,052 both of which disclose providing a yoke like mechanism for simultaneously engaging a pair of heads and moving the heads to a desired position. However, the individual yokes for engaging the slotting and creasing heads are mounted to a common carrier for moving the yokes to a desired axial position, such that the adjustment mechanism is not conveniently designed to provide for independent adjustment of the slotting and creasing heads. Further, the adjustment mechanisms disclosed in these patents appear to be configured for providing adjustment in machines which include a single slotting and creasing station, and the addition of further slotting and creasing stations with associated adjustment mechanisms would add considerably to the space requirement as well as to the cost of the machine.

Accordingly, there is a need for a tool positioning device which may be used in combination with a machine for working paperboard blanks wherein the tool positioning device provides for easy adjustment of tool heads along shafts. In addition, there is a need for such a tool positioning device wherein the device may be adapted for use with various numbers of pairs of shafts without imposing a substantial space requirement between adjacent stations for accommodating the positioning device.

SUMMARY OF THE INVENTION

The present invention provides a tool positioning device which is adapted for use in a machine for working paperboard blanks conveyed in a horizontal direction through the machine. The machine includes pairs of parallel rotary shafts wherein each pair of shafts includes a first or upper shaft and a second or lower shaft located below the upper shaft. A plurality of tool heads are mounted on each of the first and second shafts. The tool heads on the first shafts cooperate with the tool heads on the second shafts to work a paperboard blank conveyed along a path between the first and second shafts. For example, the tools on one pair of shafts are preferably configured to form crease or score lines on a paperboard blank and the tools on a further pair of shafts are configured to form slots on the paperboard blank. Additional pairs of shafts and tool heads may be provided for performing similar operations on the paperboard blank as it is conveyed through the machine.

The tool positioning device includes a plurality of coupling members located on one side of the paperboard blank path wherein the coupling members include portions for engaging the tool heads to reposition the tool heads axially along the shafts. An actuator is associated with each of the coupling members to move the coupling member into engagement with the tool heads on both the first and second shafts of one of the pairs of shafts. Thus, each pair of shafts is provided with a separate coupling member for moving the heads on that particular pair of shafts.

The actuators are mounted to an actuator support with the coupling members extending downwardly from the actuator support toward respective pairs of shafts. The coupling members comprise a pair of spaced arms forming engagement portions which are actuated in linear movement into engagement with the tool heads wherein the arms are extended downwardly to be positioned adjacent to one side or the other of the tool heads in preparation for pushing the tool heads along the shafts to a desired position. A transfer structure supports the actuator support for movement in a direction parallel to the shafts wherein movement of the transfer structure with the coupling members engaged with the tool heads effects positioning of the tool heads to the desired positions on the shafts. Each of the actuators is operable independently of any other one of the actuators to thereby permit selected positioning of any tool head independently of the position selected for other tool heads and thereby provide increased flexibility in positioning of the tool heads within the machine.

Therefore, it is an object of the present invention to provide a tool positioning device for positioning tool heads along pairs of rotary shafts wherein the device includes engagement portions movable in linear movement toward the tool heads for engagement with the tool heads.

It is a further object of the invention to provide such a tool positioning device wherein the engagement portions are movable in a vertical direction past a first one of the shafts into coupling engagement with a tool head on a second one of the shafts.

It is yet another object of the invention to provide such a positioning device for use in a machine conveying a paperboard blank along a path wherein the engagement portions are movable from one side of the path into engagement with tool heads on both the first and second shafts of a pair of shafts.

Other objects and advantages of the invention will be apparent from the following description, the accompanying drawings and the appended claims.

BRIEF DESCRIPTION OF THE DRAWINGS

FIG. 2 is a side elevational view of the tool positioning device of FIG. 1.

DETAILED DESCRIPTION OF THE PREFERRED EMBODIMENT

Figure 1:
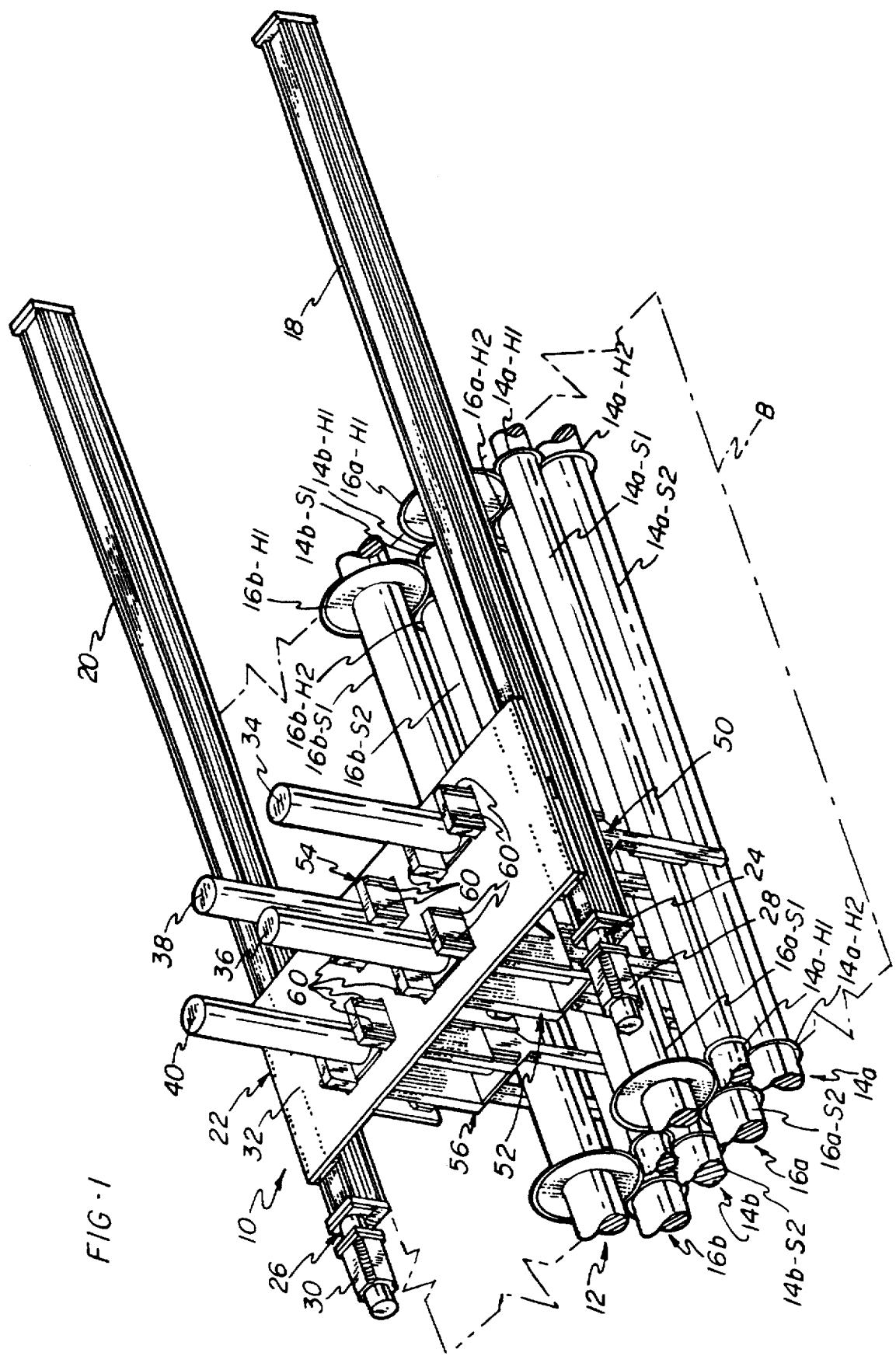
FIG. 1 is a diagrammatic perspective view of the tool positioning device of the present invention showing the location of the positioning device relative to tool head supporting shafts in a machine for working a paperboard blank.

Referring to FIGS. 1 and 2, the tool positioning device 10 of the present invention is shown in combination with a machine 12 for working paperboard blanks wherein only a portion of the machine is shown for the purpose of illustrating the function of the tool positioning device 10.

The machine 12 preferably includes a plurality of stations for working on a paperboard blank B conveyed therethrough, and in the embodiment shown includes a pair of creasing or scoring stations 14a, 14b and a pair of slotting stations 16a, 16b wherein the scoring stations 14a, 14b are arranged in alternating sequence with the slotting stations 16a, 16b. However, it should be understood that the present invention may be used with stations arranged in other conventional sequences, such as stations arranged in the sequences of score-score-slot, slot-score-slot, or others, as viewed in the direction of travel of paperboard blanks through the machine 12.

Each of the stations 14a, 16a, 14b, 16b includes a first or upper rotary shaft S1 and a second or lower rotary shaft S2 wherein the first shaft S1 is located directly above the second shaft S2. The shafts S1 and S2 for each station 14a, 16a, 14b, 16b are indicated as a suffix of the station number, such as 14a-S1, 14a-S2, etc.

The first and second shafts S1, S2 carry a plurality of upper and lower tool heads H1, H2 for performing scoring and slotting operations in a conventional manner in the stations 14a, 14b and 16a, 16b, respectively. The tool heads are identified as a suffix provided in combination with their respective station number, such as 14a-H1, 14a-H2, etc. It should be noted that the shafts S1, S2 are aligned parallel to each other and support their respective heads H1, H2 for rotating movement as a paperboard blank B is conveyed horizontally along a path P passing between the first and second shafts S1, S2 to permit the heads H1, H2 to operate upon the blank B in a conventional manner to form a box or similar final product.

As may be best seen in FIG. 1, the tool positioning device 10 is supported above the stations 14a, 16a, 14b, 16b by a transfer structure comprising a pair of rail members 18, 20 which support an actuator support 22 for linear movement in a direction parallel to the tool head supporting shafts. The transfer structure preferably comprises ball screw drive members 24, 26, or a similar linear drive device, extending through the rail members 18, 20 and driven by a respective motor 28, 30. The actuator support 22 includes a platform 32 resting on top of the rail members 18, 20 for sliding movement and operably connected to drive members 24, 26.

The platform 32 supports a plurality of linear actuators 34, 36, 38, 40 including respective driven portions 42, 44, 46, 48 (FIG. 2) extending vertically downwardly below the platform 32. The driven portions 42, 44, 46, 48 of the actuators 34, 36, 38, 40 are connected to respective coupling members 50, 52, 54, 56 wherein the actuators move the coupling members into engagement with the stations 14a, 16a, 14b, 16b. Specifically, each of the coupling members 50, 52, 54, 56 includes a pair of downwardly extending, spaced arms A1, A2 wherein the arms for a particular coupling member are identified by the suffix A1 or A2 in combination with the numeral of the coupling member with which the arms are associated.

The coupling members 50, 52, 54, 56 are guided in vertical linear movement by means of a plurality of guide bearings 58 rigidly attached to the platform 32 and engaging with cooperating bearing strips 60 located on either side of each of the coupling members 50, 52, 54, 56. As may be best seen in FIG. 2, the arms A1, A2 of the coupling members are adapted to extend downwardly from one side of the path P to either side of both of the respective shafts S1, S2 in each of the stations 14a, 16a, 14b, 16b. For example, the arms 50-A1 and 50-A2 are adapted to extend downwardly to a position adjacent to the heads 14a-H1 and 14a-H2. With the arms 50-A1, 50-A2 thus positioned, the motors 28, 30 on the transfer structure may be actuated to move the actuator support 22 in linear movement to a desired position along the rails 18, 20 whereby the heads 14a-H1 and 14a-H2 will be slid along their respective shafts 14a-S1, 14a-S2 to predetermined positions during a machine setup operation. It should be apparent that the coupling members 52, 54, 56 associated with the other stations 16a, 14b, 16b may be operated in a similar manner to locate their respective tool heads at desired positions.

Referring to FIG. 2, it can be seen that the upper heads H1 and shafts S1 in the scoring stations 14a, 14b are smaller than the lower heads H2 and shafts S2. To accomodate the different diameter heads, the arms A1, A2 of the coupling members 50 and 54 are each provided with inwardly stepped portions 62 for moving into position closely adjacent to the sides of the upper shafts S1.

The tool head shafts S1, S2 shown for the slotting stations 16a and 16b are of substantially the same diameter such that a uniform spacing is provided between the arms A1 and A2 of the slotting stations 16a, 16b for engaging both of the respective upper and lower tool heads H1, H2. Further, it should be noted that each of the coupling members 50, 52, 54, 56 may be retracted upwardly to clear the upper heads H1 whereby the actuator support 22 may be moved axially to a desired location adjacent to any particular set of heads which are to be positioned along the shafts S1, S2. For example, the coupling member 54 is illustrated in FIG. 2 as being partially retracted by the actuator 38 above the station 14b. Also, the arms A1, A2 may be partially extended downwardly to engage only an upper head H1, for example, whereby selective coupling with one or both of the heads in a station is provided by the present invention.

It should be apparent from the above description that each of the actuators 34, 36, 38, 40 is independently operable to engage with the tool heads such that the tool heads of each of the stations 14a, 16a, 14b, 16b may be selectively positioned independently of the tool head positioning for the other stations. Further, it should be apparent that the present tool positioning device provides for independent positioning of tool heads or pairs of tool heads within any one station without being restricted by predetermined spacing relationships between the tool heads in that station.

Further, it should be understood that the tool positioning device of the present invention is preferably connected to a controller which may be programmed to energize the actuators and the transfer structure. Thus, the positioning device may be automatically controlled to move the tool heads to predetermined positions in order to set up the machine to perform a particular operation.

Accordingly, the tool positioning device of the present invention provides increased flexibility for positioning any of the tool heads within a machine independently of the position of other tool heads within the same machine. Further, the present tool positioning device provides tool engaging members which are conveniently held in a retracted position when not operating to position the tool heads. Further, it should be noted that the present design may be conveniently expanded to provide additional actuators and coupling members if additional work stations are provided wherein an actuator may be added for each additional station such that one actuator is provided for each of the stations in the machine.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A tool positioning device in a machine for working paperboard blanks conveyed in a horizontal direction through the machine, the machine including pairs of parallel rotary shafts wherein each pair of shafts includes a first, upper shaft and a second, lower shaft located below said upper shaft, and a plurality of tool heads mounted on each of said first and second shafts, said tool heads on said first shafts cooperating with said tool heads on said second shafts to work a paperboard blank conveyed along a path between said first and second shafts, said tool positioning device comprising:

a plurality of coupling members located on one side of said path, said coupling members including vertically extending portions for engaging said tool heads to reposition said tool heads axially along said shafts;

means for guiding said coupling member in movement in a direction substantially perpendicular to said path; and wherein each said coupling member is movable linearly in a vertical direction into engagement with said tool heads on both said first and said second shafts of one of said pairs of shafts.

2. The device of claim 1 including an actuator for each of said coupling members wherein said actuators actuate said coupling members in movement toward and away from said tool heads.

3. The device of claim 2 wherein said actuators and said coupling members are supported for movement in an axial direction parallel to said first and second shafts.

4. The device of claim 1 wherein said portions for engaging said tool heads comprises a pair of arms on each of said coupling members for engaging said tool heads on one of said pairs of shafts.

5. A tool positioning device in combination with a machine for working paperboard blanks conveyed in a horizontal direction through the machine, the machine including a pair of parallel rotary shafts arranged one over the other, and a plurality of tool heads mounted on each of said shafts to work a paperboard blank as it is conveyed along a path between said shafts, said tool positioning device comprising:

an actuator support;

a transfer structure supporting said actuator support for movement in a direction parallel to the shafts;

at least one actuator mounted on said actuator support;

a coupling member including a vertically extending portion for engaging said tool heads, said coupling member actuated by said actuator to move linearly in a vertical direction toward said tool heads on said shafts whereby said coupling member is coupled to said tool heads for axial positioning of said tool heads to predetermined positions along said shafts;

means on said actuator support for guiding said coupling member in movement relative to said actuator support in a direction substantially perpendicular to said path; and wherein said coupling member is supported for movement in said vertical direction past a first one of said shafts into coupling engagement with a tool head on a second one of said shafts.

6. The device of claim 5 wherein said coupling member comprises a pair of spaced arms for positioning on opposing sides of said shafts.

7. The device of claim 5 wherein said coupling member is configured to engage tool heads on both of said shafts in response to actuation of said actuator.

8. The device of claim 7 wherein said coupling member includes a stepped portion whereby said coupling member is configured to simultaneously engage different size tool heads on both of said shafts.

9. The device of claim 1 including a plurality of actuators mounted on said actuator support and coupling members actuated by respective actuators wherein each said actuator is operable independently of other ones of said actuators.

10. The device of claim 5 wherein said transfer structure comprises a ball screw for conveying said actuator support along said transfer structure.

11. A tool positioning device in a machine for working paperboard blanks conveyed in a horizontal direction through the machine, the machine including pairs of parallel rotary shafts wherein each pair of shafts includes a first, upper shaft and a second, lower shaft located below said upper shaft, and a plurality of tool heads mounted on each of said first and second shafts, said tool heads on said first shafts cooperating with said toolheads on said second shafts to work a paperboard blank conveyed along a path between said first and second shafts, said tool positioning device comprising:

an actuator support;

a transfer structure supporting said actuator support and including a driver for driving said actuator support in movement parallel to said shafts;

a plurality of actuators mounted on said actuator support wherein an actuator is mounted over each of said pairs of shafts;

a coupling member operably connected to each of said actuators and including a vertically extending portion for engaging said tool heads;

means on said actuator support for guiding said coupling member in movement relative to said actuator support in direction substantially perpendicular to said path; and wherein each of said coupling members is actuated by a respective actuator to move linearly in a vertical direction perpendicular to said path toward said tool heads on a respective pair of shafts to thereby engage at least one of said tool heads for axial positioning of said at least one tool head to a predetermined position along a respective shaft.

12. The device of claim 11 wherein said coupling members comprise a pair of spaced arms for positioning on opposing sides of said shafts.

13. The device of claim 12 wherein said arms of said coupling members include end portions which are movable between an upper position located above a respective first shaft and a lower position located adjacent to a respective second shaft.

14. The device of claim 12 wherein said pairs of spaced arms are adapted to simultaneously engage tool heads on said first and second shafts of a respective pair of shafts.

15. The device of claim 14 wherein said pairs of spaced arms include stepped portions to thereby facilitate engagement of tool heads having different diameters.

16. The device of claim 11 wherein each said actuator is operable independently of other ones of said actuators.

17. The device of claim 11 wherein said actuators comprise linear actuators for moving said coupling members in linear movement.

18. The device of claim 11 wherein said pairs of said shafts carry tool heads for scoring and slotting paperboard blanks to define scoring and slotting stations and said coupling members being positioned to extend vertically between said stations.

19. The device of claim 18 wherein said transfer structure supports said actuator support above said scoring and slotting stations.

20. The device of claim 11 wherein said transfer structure includes a pair of support rails for supporting said actuator support and said driver comprises drive members.

* * * * *

UNITED STATES PATENT AND TRADEMARK OFFICE
CERTIFICATE OF CORRECTION

PATENT NO.  : 5,779,617
DATED       : July 14, 1998
INVENTOR(S) : Barry E. Larkin and Meyer L. Ruthenberg It is certified that error appears in the above-indentified patent and that said Letters Patent is hereby corrected as shown below:

Claim 9, line 1, should refer to claim 5 instead of claim 1.

Signed and Sealed this

Twenty-seventh Day of October, 1998

Attest:

BRUCE LEHMAN

*Attesting Officer*     *Commissioner of Patents and Trademarks*